Figure 1:
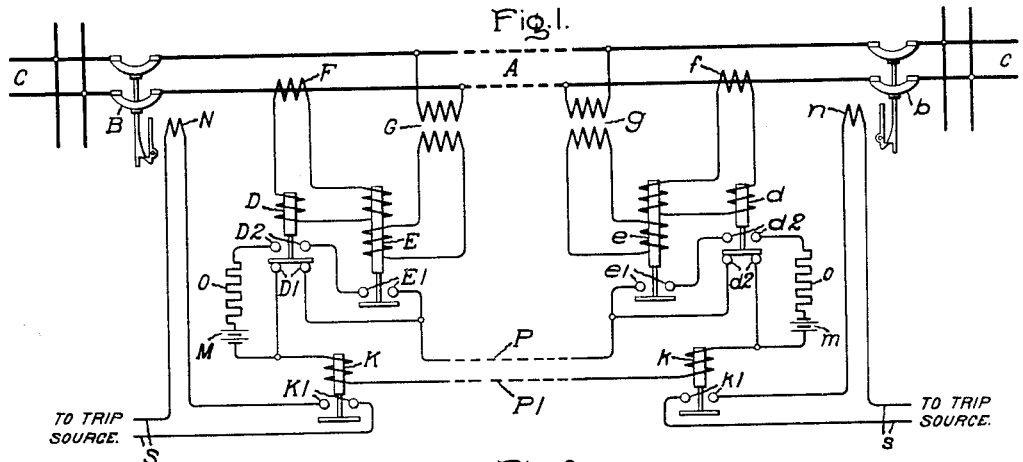

March 6, 1934. T. W. ROSS 1,950,193

PROTECTIVE ARRANGEMENT FOR ELECTRIC CIRCUITS

Filed Feb. 28, 1933

Inventor
Thomas W. Ross,
by Charles V. Tullar
His Attorney

Patented Mar. 6, 1934

1,950,193

UNITED STATES PATENT OFFICE 1,950,193

PROTECTIVE ARRANGEMENT FOR ELECTRIC CIRCUITS

Thomas Wylie Ross, Sale, England, assignor to General Electric Company, a corporation of New York Application February 28, 1933, Serial No. 659,020
In Great Britain March 11, 1932

6 Claims. (Cl. 175—294)

My invention relates to improvements in protective arrangements for electric circuits and particularly sectionalized electric supply systems.

In order that continuity of supply may be maintained as far as possible under all conditions it is usual to divide electric supply systems into sections by means of circuit breakers and to provide discriminating protective means which, during fault conditions, will cause to be tripped only the circuit breakers controlling the faulty section, leaving the rest of the system in service. Such protection may be provided by many well known means. Among these are arrangements in which pilot wires, such as telephone wires, are employed to pass a current which prevents the protective devices from tripping any of the circuit breakers except those controlling the faulty section. In the case of the faulty section, no current is caused to flow through the pilot wires and therefore the circuit breakers controlling this section are allowed to trip. In these arrangements it is usual to delay the operation of the protective devices for a time interval which is sufficiently long to ensure that the current in the pilot wires has operated the locking devices which prevent the tripping of the circuit breakers. This delay in tripping the circuit breakers controlling the faulty section is undesirable. In other known systems, the pilot wires are used for comparing the phase and magnitude of the currents flowing at the ends of the section and, if these are equal, no current flows through the pilot wires and tripping of the circuit breaker does not take place. Where, however, the pilot wires are of the telephone type it is often undesirable to connect them to the power circuit.

The object of my invention is to provide an improved protective arrangement in which delay in tripping the circuit breakers controlling a faulty circuit section is minimized and in which it is unnecessary to connect the pilot wires to the power circuit.

According to my invention, in a sectionalized electric supply system, each section to be protected has an associated pilot circuit connecting relays which control the respective tripping circuits for the circuit breakers at the ends of the section. Each section is provided at each end with protective relay means by which an auxiliary source of electric supply separate from the main power supply to the network is connected to the associated pilot circuit when a fault occurs. The protective relay means are arranged to prevent operation of the tripping relays except on the occurrence of a fault in the section when power flows into the section associated with the pilot circuit whereupon current flowing from the auxiliary supply operates one or both tripping relays to cause the respective circuit breakers to be opened.

In carrying out my invention each protective relay means may be so arranged as normally to interrupt the pilot circuit but to complete the pilot circuit on the occurrence of a fault in the section when power current flows into the section at the end adjacent the protective relay means, whereupon the current flowing in the pilot circuit operates one or both tripping relays. Alternatively each protective relay means may be so arranged as normally to establish a circuit for diverting current from the tripping relay for that end of the section to which the relay means pertains, the circuit being interrupted by operation of the relay means on the occurrence of a fault in the section when power current flows into the section at the end adjacent the protective relay means. The protective relay means at the ends of the protected section may operate to connect the respective auxiliary sources of electric supply to the pilot circuit in opposite senses or phases on the occurrence of a fault on the section when power current flows into the protected section from adjoining sections at both ends. In a modified arrangement, the circuit into which current is diverted from the tripping relay is not normally established but is adapted to be established by operation of the protective relay means on the occurrence of a fault when power flows out of the protected section at the end thereof to which the protective relay means pertains. In this arrangement, the protective relay means at the ends of the protected section may operate to connect respective auxiliary sources of electric supply across the tripping relays in the pilot circuit in the same senses or phases on the occurrence of a fault on the section when power current flows into the protected section from adjoining sections at both ends.

My invention will be better understood from the following description when considered in connection with the accompanying drawing and its scope will be pointed out in the appended claims.

Figure 2:
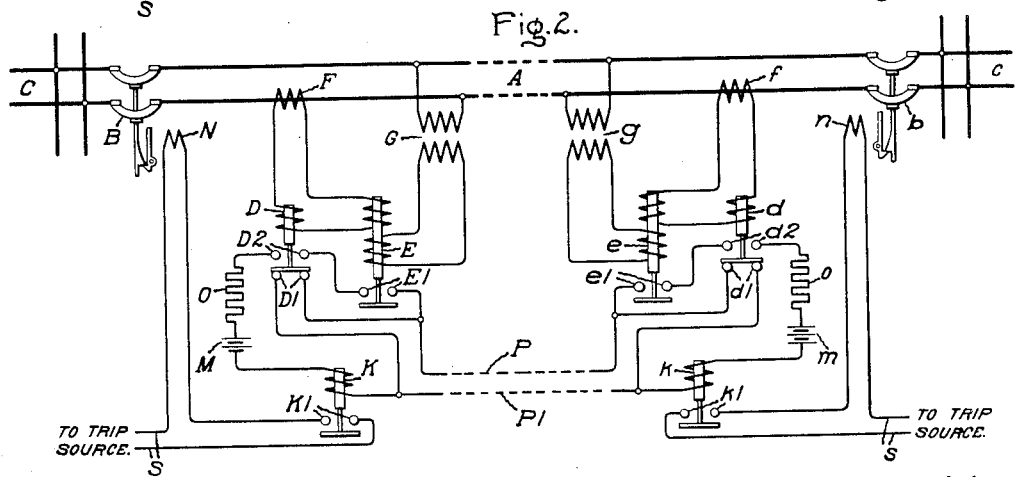
Figure 3:
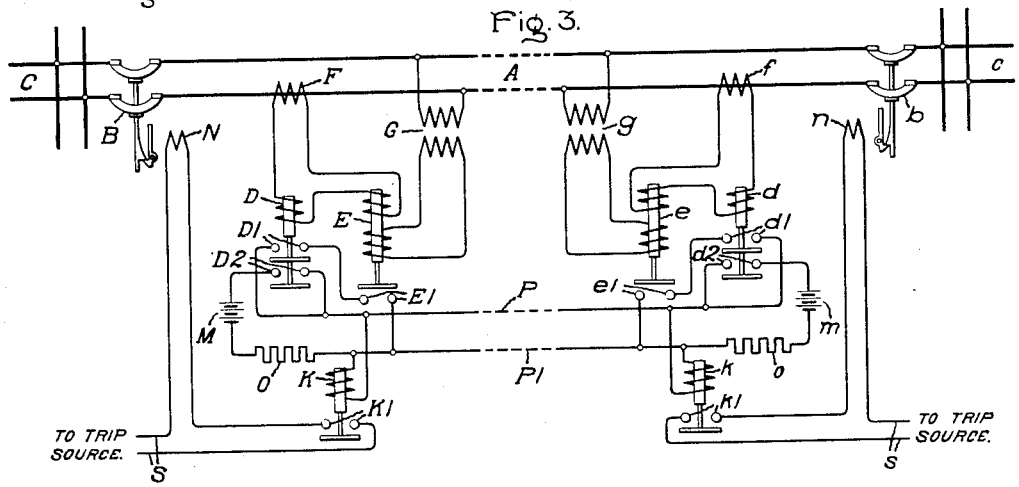

Fig. 1 illustrates diagrammatically a protective arrangement embodying my invention and Figs. 2 and 3 illustrate diagrammatically protective arrangements embodying modifications of my invention. In each figure, small reference letters are employed to designate at one end of the section to be protected the parts which are similar to the parts at the other end of the section indicated by corresponding capital letters.

In Fig. 1, the section to be protected is designated A and is represented as being adapted to be interconnected at its ends by circuit breakers B, b with adjoining sections of the system, indicated at C and c respectively.

For convenience of description, the arrangements at one end of the section to be protected will be described, it being understood that similar arrangements are provided at the other end of the section.

The relays D and E, forming the protective relay means for the end of the section being described, have their operating coils energized directly or otherwise from the system in any of the well known ways, being represented in the arrangement illustrated as connected to the system by current and potential transformers, F, G respectively. The relay D may be an over-current or earth leakage relay, preferably without time delay means, having two sets of contacts D1 and D2. The set of contacts D1 is normally closed while the set of contacts D2 is normally open. The relay E, which is a directional relay of any suitable type, is arranged to close its contacts E1 only when power is flowing into the section A from the adjoining section C through the circuit breaker B. At K there is indicated an auxiliary or tripping relay which, when energized, operates to close its contacts K1 which control the supply of current from a source of electric current, represented by conductors S, to the trip coil N of the adjacent circuit breaker B. The tripping relay may be of any suitable type and is preferably of the type in which an interval of time elapses after its operating coil is energized before its contacts K1 are closed.

Extending between the relays at one end of the section A and the relays at the other end of the section are pilot conductors P and P1. The end terminal of the pilot conductor P is connected to one contact of the directional relay E and to one contact of the normally closed set of contacts D1 of the over-current relay D. The terminal of the other pilot conductor P1 is connected through the operating coil of the tripping relay K to the other contact of the normally closed set of contacts D1 of the relay D and to one terminal of an auxiliary source of electric supply M, which may be alternating current, direct current, or impulses of current, separate from the main power supply to the system. The remaining contact of the set of contacts E1 for the directional relay E is connected to one of the normally open contacts D2 of the over-current relay D the other contact of which is connected to the other terminal of the auxiliary source of supply M preferably through a resistance O for protecting the auxiliary source M against heavy current discharge.

The arrangement thus described for one end of the section A is duplicated at the other end of the section A except that the auxiliary source of supply m is connected in a reverse direction of polarity, or with the opposite phase direction, to the pilot conductor P1 and to one of the normally open contacts d2 of the over-current relay d.

Under normal conditions, the various relays are inactive, as illustrated in the drawing. If now a fault occurs on the section A, current will flow into the section from the adjacent sections of the system through one or both circuit breakers B, b at the ends of the section A. Assuming that the fault current flows into the section at one end only, for example from the section C into the section A through the circuit breaker B, then the over-current relay D and the directional relay E for this end of the section A will operate and the over-current relay d and the directional relay e for the remote end of the section A will remain inactive. Under these circumstances, the auxiliary source of supply M will be connected in circuit with the pilot wires P1 and P and the tripping relays K, k. Thus the tripping relays K, k will operate to trip their respective circuit breakers B, b and so isolate the section A from the main power supply. If, on the other hand, fault current flows into the section A at both ends, the overload and directional relays D and E respectively for one end and the overload and directional relays d and e respectively for the other end of the section will operate thereby to connect the auxiliary sources M, m serially in circuit with the pilot conductors P, P1 and the tripping relays K, k. Since the sources M, m are connected to this pilot circuit in opposite directions of polarity or phases, current will circulate in the pilot circuit thereby energizing the coils of the tripping relays K, k to cause these relays to trip their respective circuit breakers B, b and isolate the section from the system. If a heavy current passes through the section, for example by reason of a fault occurring at a point on the system external to the section A, both the over-current relays D, d will operate and one of the directional relays E, e (namely that appertaining to the end of the section A at which the current is entering) will operate thus to connect the adjacent auxiliary source of supply M or m, as the case may be, to the pilot circuit. The terminal of the pilot conductor P at the other end of the section will however be isolated by reason of the operation of the over-current relay D or d as the case may be, and the failure to operate of the associated directional relay E or e. The pilot circuit thus being interrupted, no current will circulate through the coils of the tripping relays K, k. Accordingly, neither of these relays will operate and the section A thus remains connected to the system.

It is preferable that each of the over-current relays D, d should be arranged so that its normally closed set of contacts would open when the operating current of the relay is somewhat lower than that which is necessary to close its normally open contacts. This is to ensure that during faults on other sections of the system, which may cause an excess of current to flow through the protected section A, the normally closed contacts of the over-current relay at the remote end of the section are certain to be opened before the normally open contacts of the corresponding relay at the adjacent end are closed.

In the arrangement illustrated in Fig. 2, the apparatus and general organization thereof are substantially identical to those of the arrangement illustrated in Fig. I. In this case, however, the normally closed contacts D1 of the overload relay D are arranged normally to connect the pilot conductors P, P1 together directly, that is to say without including in the circuit the operating coil of the tripping relay K for this end of the section. Similarly, at the other end of the section A, the normally closed contacts d1 are arranged to connect the pilot wires P, P1 together directly, that is to say without including in this circuit the operating coil of the tripping relay k at this end of the section. With this arrangement, in the event of the fault current flowing into the protected section A, at one end only, for instance when fault current flows from the section C through the circuit breaker B into the section A, the protective relays D and E for this end of the section operate to connect the auxiliary supply M in circuit with the coil of tripping relay K and the pilot wires P, P1. However the coil of tripping relay k at the remote end is excluded from the pilot circuit, that is to say current is diverted from the tripping relay k at the contacts of the overload relay d. Thus, only one of the tripping relays, namely that appertaining to the end of the section at which power current flows into the section (in the assumed case, the tripping relay K) is operated to open its associated circuit breaker.

In the arrangement illustrated in Fig. 3, the operating coils of the tripping relays K, k are connected across the pilot conductors P, P1 and are designed to have a greater resistance than the resistance of the pilot conductors. In this case, the directional relay E is arranged to close its contacts E1 when power is flowing from the protected section A into the adjacent section C but to open its contacts when power flows from the section C into the section A. The set of contacts E1 is adapted to be connected in circuit with the normally open set of contacts D1 (replacing the normally closed set of contacts D1 in the previously described arrangements) on the adjacent overload relay D across the pilot conductors P, P1. Thus, as long as fault power is flowing from the protected section A into the adjoining section C the pilot conductors P and P1 are short-circuited. Similarly, for the other end of the section A, as long as fault power flows from the section A into the adjoining section c, the contacts e1 of the directional relay e and the contacts d1 of the overload relay d establish connection between the pilot conductors P and P1. In this case the overload relays D, d are adapted to connect respective auxiliary sources of electric supply M, m to the pilot conductors in the same direction of polarity or phase. In the event of a fault occurring in the protected section A, which is fed from both ends, the contacts of both of the directional relays E and e will be open and the overload relays D, d will operate, the contacts D2 of the overload relay D establishing a local circuit comprising the auxiliary electric supply M and the operating coil for the tripping relay K at this end of the section, and the overload relay d establishing a local circuit comprising the auxiliary electric supply m and the operating coil for the tripping relay k. Accordingly, both tripping relays K, k will operate thereby to trip their associated circuit breakers B, b. On the occurrence of a fault in the protected section A which is fed from one end only, for instance from the adjoining section C through the circuit breaker B, the directional relay E will have its contacts open and the over-current relay D for this end of the section will operate. At the other end of the section the directional relay e and the over-current relay d will remain in normal position. Accordingly the operating coils for the tripping relays K, k will be energized thereby to cause their respective circuit breakers B, b to be tripped. If a heavy current passes through the section A, due for instance to a fault on the network external to the section A, the overload relays D and d will operate and one or other of the directional relays E, e (namely that appertaining to the end of the section at which current flows out of the section) will operate to close its contacts. Accordingly at this end of the section, the pilot conductors P, P1 will be short-circuited and, by reason of the fact that the auxiliary electric sources M and m will be connected to the pilot conductors in the same direction of polarity or phase, current will be diverted from the coils of both tripping relays K, k so that these relays will remain unoperated and the section A thus remain connected to the system.

It will be observed that in all the arrangements pilot conductors are in use only during fault conditions and any suitable arrangement may be employed at other times for communication purposes. The fault operating relays may, for example, have contacts for changing the pilot conductors from communication to protective use, or the communication can be permanently superimposed on the pilot conductors by well known means.

What I claim as new and desire to secure by Letters Patent of the United States, is:

1. In combination with an electric circuit and means for interrupting said circuit at each of two spaced points thereof, means for controlling said interrupting means including a pilot circuit extending between said points, a tripping relay for each circuit interrupting means connected to be energized from said pilot circuit and arranged, when energized, to effect the opening of its associated circuit interrupting means, means for energizing said pilot circuit and fault responsive directional and overcurrent relay means connected to be energized from said electric circuit and including means for normally preventing the energization of said tripping relays from said pilot circuit operative to effect the energization of the tripping relays only on the occurrence of a fault within the portion of the electric circuit between said points.

2. In combination with an electric circuit and means for interrupting the circuit at each of two spaced points thereof, means for controlling said interrupting means including a pilot circuit extending between said points, a tripping relay for each circuit interrupting means connected in said pilot circuit and arranged, when energized, to effect the opening of its associated circuit interrupting means, a source of current adjacent each of said points for energizing said pilot circuit and fault responsive directional and overcurrent relay means connected to be energized from said electric circuit and including means for normally preventing the energization of said tripping relays by said sources operative to effect the energization of the tripping relays only on the occurrence of a fault within the portion of the electric circuit between said points with power flow into said circuit portion from only one of said points.

3. In combination with an electric circuit and means for interrupting the circuit at each of two spaced points thereof, means for controlling said interrupting means including a pilot circuit extending between said points, a tripping relay for each circuit interrupting means connected in said pilot circuit and arranged, when energized, to effect the opening of its associated circuit interrupting means, a source of current adjacent each of said points for energizing said pilot circuit and fault responsive directional overcurrent relay means connected to be energized from said circuit including means for normally preventing the energization of said tripping relays by said sources operative to connect said sources in series cumulative with said tripping relays on the occurrence of a fault within the portion of the circuit between said points and to connect said tripping relays to one of said sources on the occurrence of a fault within the electric circuit between said points with power flow into said circuit portion from only one of said points.

4. In combination with an electric circuit and means for interrupting said circuit at each of two spaced points thereof whereby to isolate the section of the circuit between said points, means for controlling said interrupting means including a pilot circuit, a tripping relay for each circuit interrupting means connected to be energized from said pilot circuit and arranged, when energized, to effect the opening of its associated circuit breaker, fault responsive power directional relay means at each of said points connected to be energized from said electric circuit, a connection in said pilot circuit at each of said points arranged to be completed by the power directional relay means at the point when power flows out of the section at said point, overcurrent relay means associated with each of said power directional relay means and connected to be energized from said electric circuit, a connection across said pilot circuit at each of said points arranged normally to be completed by the overcurrent relay means at the point and a connection in said pilot circuit at each of said points in series with the connection controlled by the power directional relay means at the point arranged to be completed by said overcurrent relay means in response to a predetermined current condition of said electric circuit.

5. In an arrangement for controlling an electric circuit in accordance with the relation between circuit conditions at two points of the circuits, a normally deenergized pilot circuit extending between said points, means for interrupting said electric circuit at each of said points in response to the energization of said pilot circuit including fault responsive directional and overcurrent relay means connected to be energized from the circuit operative to effect the energization of the pilot circuit in a manner to cause the operation of said interrupting means only on the occurrence of a fault within the portion of the electric circuit between said points.

6. In an arrangement for controlling an electric circuit in accordance with the relation between circuit conditions at two points of the circuit, a normally deenergized pilot circuit extending between said points, means for interrupting said electric circuit at each of said points in response to the energization of said pilot circuit, means for energizing said pilot circuit including fault responsive power directional and overcurrent relay means connected to be energized from said electric circuit each having contacts serially related in said pilot circuit, the connections and arrangements of said power directional and overcurrent relay means being such that their serially related contacts are closed only on the occurrence of a fault on the circuit between said points.

THOMAS WYLIE ROSS.